(12) United States Patent
Zhao et al.

(10) Patent No.: US 11,537,009 B2
(45) Date of Patent: Dec. 27, 2022

(54) ARRAY BASE PLATE AND FABRICATING METHOD THEREOF, DISPLAY PANEL AND DISPLAYING DEVICE

(71) Applicants: Chongqing BOE Optoelectronics Technology Co., Ltd., Chongqing (CN); BOE Technology Group Co., Ltd., Beijing (CN)

(72) Inventors: Yanli Zhao, Beijing (CN); Xiaoji Li, Beijing (CN); Gang Chen, Beijing (CN); He Sun, Beijing (CN); Jianghong Wen, Beijing (CN); Guang Wang, Beijing (CN); Yu Wang, Beijing (CN)

(73) Assignees: CHONGQING BOE OPTOELECTRONICS TECHNOLOGY CO., LTD., Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 13 days.

(21) Appl. No.: 17/212,432

(22) Filed: Mar. 25, 2021

(65) Prior Publication Data
US 2022/0019110 A1 Jan. 20, 2022

(30) Foreign Application Priority Data
Jul. 17, 2020 (CN) .......................... 202010699793.6

(51) Int. Cl.
*G02F 1/1345* (2006.01)
*G02F 1/1337* (2006.01)
*G02F 1/1333* (2006.01)
*G02F 1/1368* (2006.01)

(52) U.S. Cl.
CPC .... *G02F 1/133723* (2013.01); *G02F 1/13458* (2013.01); *G02F 1/133345* (2013.01); *G02F 1/1368* (2013.01); *G02F 1/13454* (2013.01)

(58) Field of Classification Search
CPC ............ G02F 1/1333; G02F 1/133345; G02F 1/13458; G02F 1/1337; G02F 1/133723; G02F 1/1345; G02F 1/13454; G02F 1/1368
See application file for complete search history.

(56) References Cited

U.S. PATENT DOCUMENTS

2016/0178953 A1* 6/2016 Ye .......................... G02F 1/1341
445/24

* cited by examiner

*Primary Examiner* — Thoi V Duong
(74) *Attorney, Agent, or Firm* — WHDA, LLP (57) ABSTRACT

An array base plate and a fabricating method thereof, a display panel and a displaying device. The array base plate includes a substrate, the substrate is divided into a displaying region and a non-displaying region that surrounds the displaying region, and the non-displaying region includes a chip binding region; the array base plate further includes a target film layer provided on the substrate, and the target film layer extends to the non-displaying region; and the target film layer has a depression structure on a side that faces the chip binding region, and a position of the depression structure corresponds to a position of the chip binding region, whereby an orthographic projection of an alignment film in the array base plate on the substrate does not have a coinciding area with the chip binding region.

20 Claims, 5 Drawing Sheets

```
providing a substrate, wherein the substrate is divided into a displaying region and a non-
displaying region that surrounds the displaying region, and the non-displaying region
comprises a chip binding region
```
— 801

```
forming the target film layer on the substrate, wherein the target film layer extends to
the non-displaying region
```
— 802

ARRAY BASE PLATE AND FABRICATING METHOD THEREOF, DISPLAY PANEL AND DISPLAYING DEVICE

CROSS REFERENCE TO RELEVANT APPLICATIONS

The present disclosure claims the priority of the Chinese patent application filed on Jul. 17, 2020 before the Chinese Patent Office with the application number of 202010699793.6 and the title of "ARRAY BASE PLATE AND FABRICATING METHOD THEREOF, DISPLAY PANEL AND DISPLAYING DEVICE", which is incorporated herein in its entirety by reference.

TECHNICAL FIELD

The present disclosure relates to the technical field of displaying, and particularly relates to an array base plate and a fabricating method thereof, a display panel and a displaying device.

BACKGROUND

Liquid Crystal Display (LCD), because of the advantages such as a small volume, a low power consumption and no radiation, has been rapidly developed in recent years, and has become the mainstream of displays in the market. With the progressive development of LCDs, products of a high screen-to-body ratio have gradually become the mainstream in the market. In order to increase the screen-to-body ratio, it is required to make the boundary frame of liquid-crystal displaying devices increasingly narrower.

Currently, liquid-crystal displaying devices require an alignment film to realize the alignment of the liquid crystal. As limited by the fabrication precision, the maximum limiting value of the EM value (i.e., the value of the distance between the edge of the alignment film and the displaying region) of the alignment film is 1.85 mm, and the minimum limiting value is 0.385 mm. Moreover, when the boundary frame of the liquid-crystal displaying device is narrowed, the distance between the chip binding region where the chip to be bound is located and the displaying region also becomes lower. For example, when the width of the boundary frame of the displaying device is 3.15 mm, it is usually required to set the distance between the chip binding region and the displaying region to be 1.42 mm. Therefore, the EM value of the alignment film at the position corresponding to the chip binding region might be greater than the distance between the chip binding region and the displaying region. When the EM value of the alignment film at the position corresponding to the chip binding region is greater than the distance between the chip binding region and the displaying region, the alignment film will be spread-coated to the chip binding region, and, subsequently, when the chip to be bound is bound with the metal wiring in the array base plate, the chip to be bound will contact the alignment film.

SUMMARY

The present disclosure provides an array base plate and a fabricating method thereof, a display panel and a displaying device.

The present disclosure provides an array base plate, wherein the array base plate comprises a substrate, the substrate is divided into a displaying region and a non-displaying region that surrounds the displaying region, and the non-displaying region comprises a chip binding region;

the array base plate further comprises a target film layer provided on the substrate, and the target film layer extends to the non-displaying region; and the target film layer has a depression structure on a side that faces the chip binding region, and a position of the depression structure corresponds to a position of the chip binding region, whereby an orthographic projection of an alignment film in the array base plate on the substrate does not have a coinciding area with the chip binding region.

Optionally, the target film layer is the alignment film, and a depressing direction of the depression structure is a direction along the non-displaying region to the displaying region.

Optionally, an orthographic projection of the depression structure on the substrate is a curve.

Optionally, a first protrusion structure and a second protrusion structure are provided on a side of the alignment film that faces the chip binding region; and the first protrusion structure and the second protrusion structure are connected to two sides of the depression structure, and protruding directions of the first protrusion structure and the second protrusion structure are a direction along the displaying region to the non-displaying region.

Optionally, both of orthographic projections of the first protrusion structure and the second protrusion structure on the substrate are a curve; and positions where the first protrusion structure and the second protrusion structure connect to the depression structure form a smooth curved surface.

Optionally, a depth of the depression structure in a first direction is 0.2 mm to 0.5 mm; and a difference between a length of the depression structure in a second direction and a length of a chip to be bound in the second direction is 3 mm to 5 mm, and the length of the depression structure is greater than the length of the chip to be bound;

wherein the first direction is the direction along the non-displaying region to the displaying region, the second direction is perpendicular to the first direction, and the second direction is parallel to a plane where the substrate is located.

Optionally, a height of the depression structure in a direction perpendicular to the substrate is equal to a thickness of the alignment film.

Optionally, the target film layer is an organic film layer, and the alignment film is arranged on the organic film layer; and a depressing direction of the depression structure is a direction perpendicular to the substrate.

Optionally, an orthographic projection of the depression structure on the substrate is a closed pattern.

Optionally, a width of the depression structure in a first direction is 20 μm to 30 μm; and a difference between a length of the depression structure in a second direction and a length of a chip to be bound in the second direction is 3 mm to 5 mm, and the length of the depression structure is greater than the length of the chip to be bound;

wherein the first direction is the direction along the non-displaying region to the displaying region, the second direction is perpendicular to the first direction, and the second direction is parallel to a plane where the substrate is located.

Optionally, a height of the depression structure in a direction perpendicular to the substrate is less than or equal to a thickness of the organic film layer.

Optionally, a thickness of the alignment film is 0.08 μm to 0.15 μm.

Optionally, a thickness of the organic film layer is 1 μm to 3 μm.

Optionally, the substrate comprises a first base plate, a thin-film transistor formed on the first base plate, and a pixel electrode connected to a drain of the thin-film transistor.

The present disclosure further discloses a display panel, wherein the display panel comprises the array base plate stated above.

Optionally, the display panel further comprises a color-film base plate, and the color-film base plate comprises a substrate base plate and an alignment-film layer that is arranged on the substrate base plate; and the substrate base plate comprises a second base plate, and a black matrix and a color-class layer that are formed on the second base plate.

The present disclosure further discloses a displaying device, wherein the displaying device comprises a chip to be bound and the display panel stated above; and the chip to be bound is arranged at the chip binding region, and is bound to a metal wiring in the array base plate.

The present disclosure further discloses a method for fabricating the array base plate stated above, wherein the method comprises:

providing a substrate, wherein the substrate is divided into a displaying region and a non-displaying region that surrounds the displaying region, and the non-displaying region comprises a chip binding region; and forming the target film layer on the substrate, wherein the target film layer extends to the non-displaying region;

wherein the target film layer has a depression structure on a side that faces the chip binding region, and a position of the depression structure corresponds to a position of the chip binding region, Whereby an orthographic projection of an alignment film in the array base plate on the substrate does not have a coinciding area with the chip binding region.

Optionally, the step of forming the target film layer on the substrate comprises:

forming the alignment film on the substrate by using an Asahikasei Photosensitive Resin (APR) plate, wherein the Asahikasei Photosensitive Resin plate has a depression pattern that corresponds to the depression structure, and a depressing direction of the depression structure is a direction along the non-displaying region to the displaying region.

Optionally, the step of forming the target film layer on the substrate comprises:

forming the organic film layer on the substrate by using a patterning process, wherein a depressing direction of a depression structure of the organic film layer is a direction perpendicular to the substrate; and after the step of forming the organic film layer on the substrate by using the patterning process, the method further comprises:

forming the alignment film on the organic film layer.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
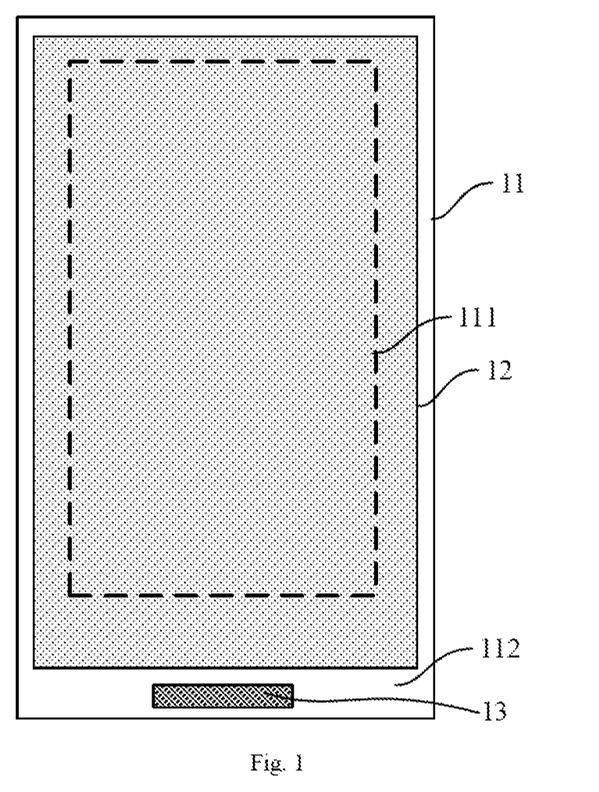
FIG. 1 shows a schematic structural diagram of an conventional array base plate.

As shown in FIG. 1, conventionally, the array base plate comprises a substrate 11 and an alignment film 12 that is formed on the substrate 11, and the substrate 11 is divided into a displaying region 111 and a non-displaying region 112 that surrounds the displaying region 111. Subsequently, after the array base plate and the color-film base plate have been aligned, it is further required to provide a chip to be bound 13 at a chip binding region within the non-displaying region 112, and bind the chip to be bound 13 with a metal wiring (such as a data line) in the array base plate.

The alignment film 12 in conventional array base plates is of a planar structure on the side that faces the chip binding region. Because, at the position corresponding to the chip binding region, the lower layer of the alignment film 12 has the metal wiring, the metal wiring causes the alignment film 12 at the position corresponding to the chip binding region to be more easily diffusible, which in turn results in that the EM value of the alignment film 12 at the position corresponding to the chip binding region is greater than the EM values of the alignment film 12 at the other positions.

Therefore, when the boundary frame of the liquid-crystal displaying device is narrowed, the distance between the chip binding region and the displaying region 111 also becomes lower, which results in that the EM value of the alignment film 12 at the position corresponding to the chip binding region can be more easily greater than the distance between the chip binding region and the displaying region 111, and the alignment film 12 will be spread-coated to the chip binding region where the chip to be bound 13 is located. Subsequently, when the chip to be bound 13 is bound with the metal wiring in the array base plate, the chip to be bound 13 will contact the alignment film 12, and penetrates the alignment film 12 with Anisotropic Conductive Film (ACF), to realize the binding between the chip to be bound 13 and the metal wiring at the lower layer of the alignment film 12 by using the ACF. However, the alignment film 12 easily absorbs water vapor, and the absorbed water vapor will corrode the leads of the chip to be bound 13, which results in that screen blacking of the liquid-crystal displaying device happens.

Therefore, the embodiments of the present disclosure, by configuring the target film layer to be of a depression structure at the position corresponding to the chip binding region, reduce the EM value of the alignment film at the position corresponding to the chip binding region, which results in that the EM value of the alignment film at the position corresponding to the chip binding region is less than or equal to the distance between the chip binding region and the displaying region. Subsequently, when the chip to be bound is bound with the metal wiring in the array base plate, the chip to be bound is not required to contact the alignment film, which prevents the corrosion of the leads of the chip to be bound caused by the water vapor absorbed by the alignment film, and in turn prevents the problem of the screen blacking of the liquid-crystal displaying device.

Figure 2:
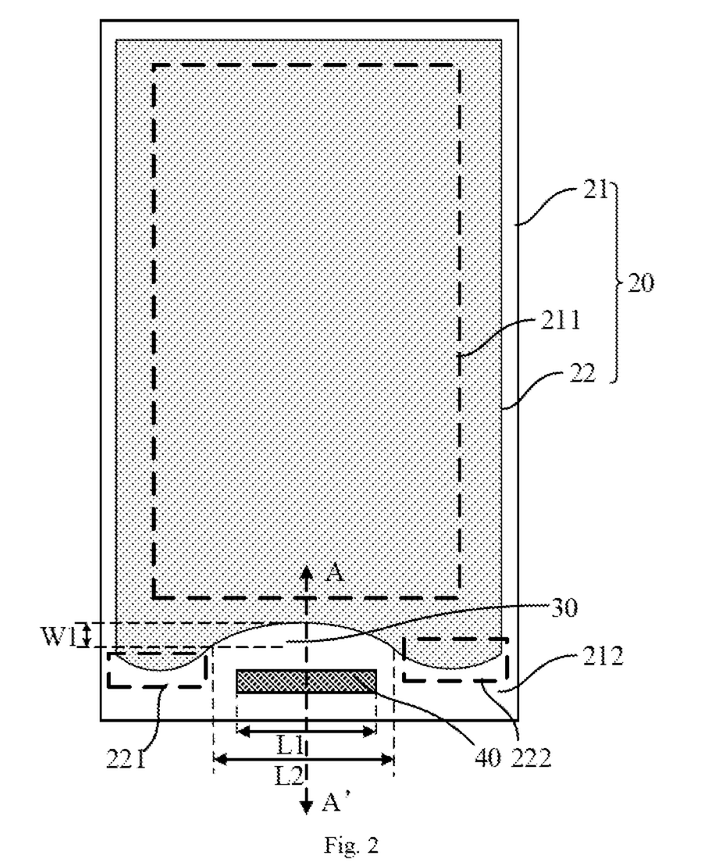
FIG. 2 shows a schematic structural diagram of the array base plate according to an embodiment of the present disclosure.
Figure 3:
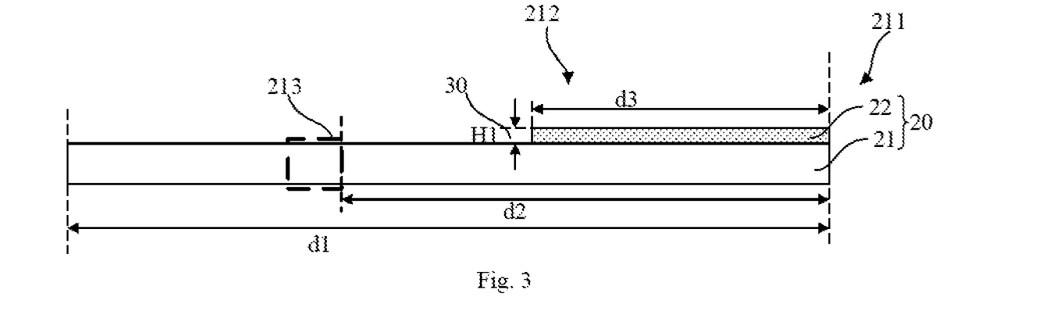
FIG. 3 shows a sectional view along the cross section A-A' of the array lase plate shown in FIG. 2.
Figure 4:
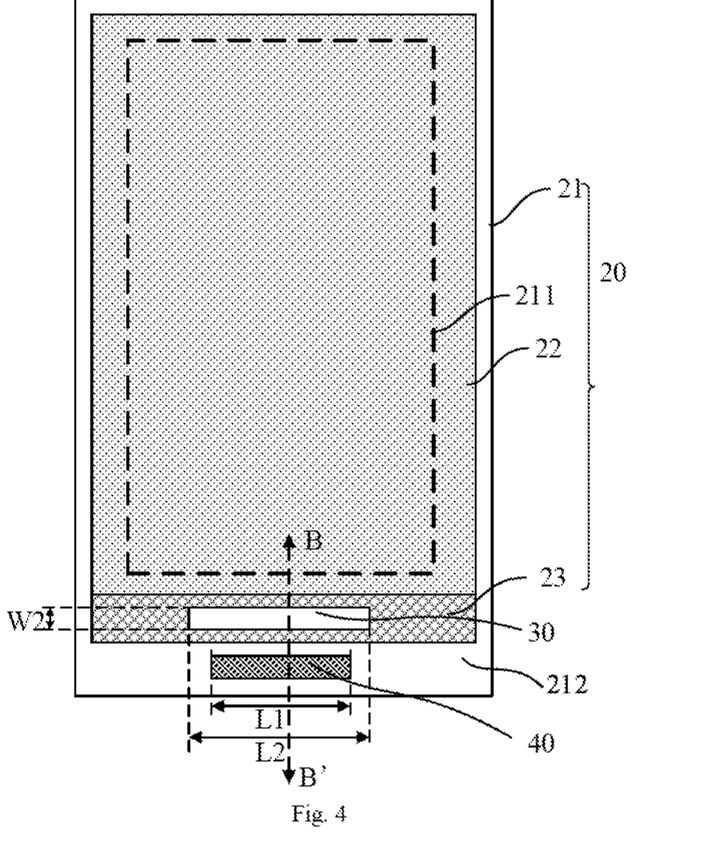
FIG. 4 shows a schematic structural diagram of the array base plate according to another embodiment of the present disclosure.
Figure 5:
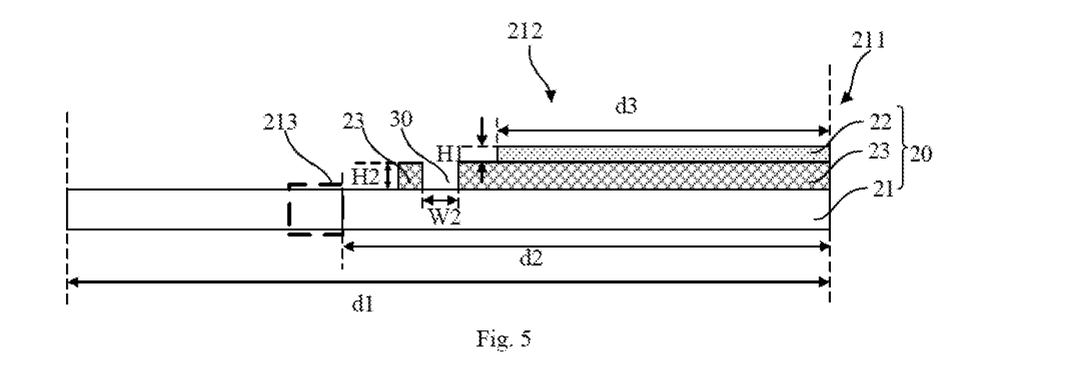
FIG. 5 shows a sectional view along the cross section B-B' of the array base plate shown in FIG. 4.

FIG. 2 shows a schematic structural diagram of the array base plate according to an embodiment of the present disclosure. FIG. 3 shows a sectional view along the cross section A-A' of the array base plate shown in FIG. 2. FIG. 4 shows a schematic structural diagram of the array base plate according to another embodiment of the present disclosure. FIG. 5 shows a sectional view along the cross section B-B' of the array base plate shown in FIG. 4.

An embodiment of the present disclosure provides an array base plate 20. The array base plate 20 comprises a substrate 21. The substrate 21 is divided into a displaying region 211 and a non-displaying region 212 that surrounds the displaying region 211. The non-displaying region 212 comprises a chip binding region 213. The array base plate 20 further comprises a target film layer provided on the substrate 21. The target film layer extends to the non-displaying region 212. The target film layer has a depression structure 30 on the side that faces the chip binding region 213, and the position of the depression structure 30 corresponds to the position of the chip binding region 213, whereby the orthographic projection of the alignment film 22 in the array base plate 20 on the substrate 21 does not have a coinciding area with the chip binding region 213.

In the practical product, the substrate 21 comprises a first base plate, a thin-film transistor formed on the first base plate, and a pixel electrode connected to the drain of the thin-flay transistor.

In an embodiment of the present disclosure, the target film layer may be the alignment film 22 or an organic film layer 23, wherein a first part of the target film layer is located at the displaying region 211, and a second part of the target film layer is located at the non-displaying region 212; in other words, the target film layer extends to the non-displaying region 212.

The non-displaying region 212 comprises a chip binding region 213. Subsequently, after the array base plate 20 and the color-film base plate have been aligned, it is further required to provide a chip to be bound 40 at the chip binding region 213 within the non-displaying region 212, and bind the chip to be bound 40 with a metal wiring in the array base plate 20.

The present embodiment, by configuring the target film layer to be of the depression structure 30 at the position corresponding to the chip binding region 213, reduces the EM value of the alignment film 22 at the position corresponding to the chip binding region 213, which results in that the EM value of the alignment film 22 at the position corresponding to the chip binding region 213 is less than or equal to the distance between the chip binding region 213 and the displaying region 211, or, in other words, the orthographic projection of the alignment film 22 on the substrate 21 does not have a coinciding area with the chip binding region 213. Therefore, the alignment film 22 will not be spread-coated to the chip binding region 213. Subsequently, when the chip to be bound 40 is bound with the metal wiring in the array base plate 20, the chip to be bound 40 is not required to contact the alignment film 22, which prevents the corrosion of the leads of the chip to be bound 40 caused by the water vapor absorbed by the alignment film 22, and in turn prevents the problem of the screen blacking of the liquid crystal displaying device.

It should be noted that the position of the depression structure 30 corresponds to the position of the chip binding region 213 particularly refers to that the central axis of the depression structure 30 in a first direction and the central axis of the chip binding region 213 in the first direction coincide, wherein the first direction is the direction along the non-displaying region 212 to the displaying region 211.

As shown in FIGS. 2 and 3, the target film layer is the alignment film 22, the depressing direction of the depression structure 30 is the direction along the non-displaying region 212 to the displaying region 211, and the opening of the depression structure 30 faces the chip binding region 213.

In an embodiment of the present disclosure, the side of the alignment film 22 that faces the chip binding region 213 is directly fabricated into the depression structure 30 and the depressing direction of the depression structure 30 is the direction along the non-displaying region 212 to the displaying region 211. Therefore, at the position corresponding to the chip binding region 213, the value of the distance between the edge of the alignment film 22 and the displaying region 211 is reduced; in other words, the EM value of the alignment film 22 is reduced. Correspondingly, the distance between the edge of the alignment film 22 and the chip binding region 213 is increased. Therefore, the alignment film 22 will not be spread-coated to the chip binding region 213.

As shown in FIG. 3, d3 represents the EM value of the alignment film 22, d1 represents the value of the distance between the edge of the substrate 21 and the displaying region 211, the width of the boundary frame of the liquid-crystal displaying device, and d2 represents the value of the distance between the chip binding region 213 and the displaying region 211.

For example, when the width d1 of the boundary frame of the liquid-crystal displaying device is 3.15 mm it is usually required to set the value d2 of the distance between the chip binding region 213 and the displaying region 211 to be 1.42 mm. In the related art, the maximum design value of the EM value of the alignment film 22 is 1.35 mm, and the minimum design value is 0.35 mm. However, as limited by the fabrication precision, in the actual fabrication process, the maximum limiting value of the EM value d3 of the alignment film 22 is 1.85 mm and the minimum value is 0.385 mm. However, the embodiments of the present disclosure, by reducing the EM value d3 of the alignment film 22 at the position corresponding to the chip binding region 213, ensure that the EM value d3 of the alignment film 22 is less than or equal to the value d2 of the distance between the chip binding region 213 and the displaying region 211, or, in other words, ensure that the EM value d3 of the alignment film 22 is less than or equal to 1.42 mm.

It should be noted that, in the actual fabrication process, the array base plate 20 shown in FIG. 2 does not comprise the chip to be bound 40, and the chip to be bound 40 is provided onto the substrate 21 in the array base plate 20 after the array base plate 20 and the color-film base plate have been aligned. The chip to be bound 40 shown in FIG. 2 is merely intended to show the position of the chip binding region 213 where the chip to be bound 40 is located, and to demonstrate the relation between the sizes of the depression structure 30 and the chip to be bound 40.

In an embodiment of the present disclosure, when the target film layer is the alignment film 22, the orthographic projection of the depression structure 30 on the substrate 21 is a curve. Particularly, the curve may be the arc shown in FIG. 2.

In the actual fabrication process, merely at the position corresponding to the chip binding region 213, the alignment film 22 is configured to be the depression structure 30, and on the side of the alignment film 22 that faces the chip binding region 213, besides the depression structure 30, the alignment film 22 further comprises a first protrusion structure 221 and a second protrusion structure 222. The first protrusion structure 221 is connected to one side of the depression structure 30, and the second protrusion structure 222 is connected to the other side of the depression structure 30. The protruding directions of the first protrusion structure 221 and the second protrusion structure 222 are the direction along the displaying region 211 to the non-displaying region 212. The orthographic projections of the first protrusion structure 221 and the second protrusion structure 222 on the substrate 21 are also curves. The positions where the first protrusion structure 221 and the second protrusion structure 222 connect to the depression structure 30 are smooth curved surfaces.

By configuring all of the first protrusion structure 221, the depression structure and the second protrusion structure 222 on the side of the alignment film 22 that faces the chip binding region 213 to be a curved surface, whereby all of the orthographic projections of the first protrusion structure 221, the depression structure and the second protrusion structure 222 on the substrate 21 are a curve, the film-formation thickness of the alignment film 22 is more uniform. If all of the orthographic projections of the first protrusion structure 221, the depression structure and the second protrusion structure 222 on the substrate 21 are configured to be a straight line segment, then the side of the alignment film 22 that faces the chip binding region 213 will have multiple right-angle corners. In the spread coating of the material of the alignment film 22, the material of the alignment film 22 easily flows towards the positions of the right-angle corners, and therefore the material of the alignment film 22 will accumulate at the positions of the right-angle corners, which makes the thickness of the formed alignment film 22 ununiform. The ununiformity of the thickness of the alignment film 22 affects the orientation of the liquid crystal, and in turn results in the ununiformity of the displaying brightnesses of different areas. Therefore, by configuring all of the orthographic projections of the first protrusion structure 221, the depression structure and the second protrusion structure 222 on the substrate 21 to be a curve, the ununiformity of the displaying brightnesses of different areas is improved.

Moreover, regarding the alignment film 22, other than the side that faces the chip binding region 213, all of the other sides of the alignment film 22 are of a planar structure.

In an embodiment of the present disclosure, when the target film layer is the alignment film 22, the depth W1 of the depression structure 30 in the first direction is 0.2 mm to 0.5 mm; the difference between the length L2 of the depression structure 30 in a second direction and the length L1 of the chip to be bound 40 in the second direction is 3 mm to 5 mm, and the length L2 of the depression structure 30 is greater than the length L1 of the chip to be bound 40; and the height H1 of the depression structure 30 in the direction perpendicular to the substrate 21 is equal to the thickness of the alignment film 22; wherein the first direction is the direction along the non-displaying region 212 to the displaying region 211, the second direction is perpendicular to the first direction, and the second direction is parallel to the plane where the substrate 21 is located.

As shown in FIGS. 4 and 5, the target film layer is the organic film layer 23, the alignment film 22 is arranged on the organic film layer 23, the depressing direction of the depression structure 30 is the direction perpendicular to the substrate 21, and the opening of the depression structure 30 faces the direction perpendicular to the substrate 21.

In an embodiment of the present disclosure, after the substrate 21 has been fabricated, one layer of the organic film layer 23 is additionally fabricated on the substrate 21, and the side of the organic film layer 23 that faces the chip binding region 213 is fabricated into the depression structure 30. The depression structure 30 is actually a slot. The depressing direction of the depression structure 30 is the direction perpendicular to the substrate 21.

Therefore, subsequently, in the spread coating of the material of the alignment film 22 to the organic film layer 23, the excessive material of the alignment film 22 will flow into the depression structure 30, which prevents the material of the alignment film 22 from flowing to the chip binding region 213, thereby, at the position corresponding to the chip binding region 213, reducing the value of the distance between the edge of the alignment film 22 and the displaying region 211, i.e., reducing the EM value of the alignment film 22. At this point, the side of the alignment film 22 that faces the chip binding region 213 is of a planar structure.

As shown in FIG. 5, d3 represents the EM value of the alignment film 22, d1 represents the value of the distance between the edge of the substrate 21 and the displaying region 211, i.e., the width of the boundary frame of the liquid-crystal displaying device, and d2 represents the value of the distance between the chip binding region 213 and the displaying region 211.

It should be noted that, in the actual fabrication process, the array base plate 20 shown in FIG. 4 does not comprise the chip to be bound 40, and the chip to be bound 40 is provided onto the substrate 21 in the array base plate 20 after the array base plate 20 and the color-film base plate have been aligned. The chip to be bound 40 shown in FIG. 4 is merely intended to show the position of the chip binding region 213 where the chip to be bound 40 is located, and to demonstrate the relation between the sizes of the depression structure 30 and the chip to be bound 40.

In an embodiment of the present disclosure, when the target film layer is the organic film layer 23, the orthographic projection of the depression structure 30 on the substrate 21 is a closed pattern.

Particularly, the closed pattern may be a rectangle, as shown in FIG. 4. Certainly, the closed pattern may also be of another shape such as a circle, an ellipse, a triangle, a trapezoid and a pentagon.

In an embodiment of the present disclosure, when the target film layer is the organic film layer 23, the width W2 of the depression structure 30 in the first direction is 20 μm to 30 μm; the difference between the length L2 of the depression structure 30 in a second direction and the length L1 of the Chip to be bound 40 in the second direction is 3 mm to 5 mm, and the length L2 of the depression structure 30 is greater than the length L1 of the chip to be bound 40 and the height H2 of the depression structure 30 in the direction perpendicular to the substrate 21 is less than or equal to the thickness of the organic film layer 23; wherein the first direction is the direction along the non-displaying region 212 to the displaying region 211, the second direction is perpendicular to the first direction, and the second direction is parallel to the plane where the substrate 21 is located.

In an embodiment of the present disclosure, the thickness of the alignment film 22 is 0.08 μm to 0.15 μm. For example, the thickness of the alignment film 22 may be 0.11 μm. When the target film layer is the alignment film 22, the height H1 of the depression structure 30 in the direction perpendicular to the substrate 21 is 0.08 μm to 0.15 μm, and the material of the alignment film 22 is polyimide (PI).

Moreover, the thickness of the organic film layer 23 is 1 μm to 3 μm. For example, the thickness of the organic film layer 23 may be 2.4 μm. When the target film layer is the organic film layer 23, the height H2 of the depression structure 30 in the direction perpendicular to the substrate 21 is less than or equal to the thickness of the organic film layer 23, for example, when the thickness of the organic film layer 23 is 1 μm, the height H2 of the depression structure 30 in the direction perpendicular to the substrate 21 is less than or equal to 1 μm. When the thickness of the organic film layer 23 is 2 μm, the height H2 of the depression structure 30 in the direction perpendicular to the substrate 21 is less than or equal to 2 μm. Moreover, the material of the organic film layer 23 may be a resin.

The embodiments of the present disclosure, by configuring the target film layer to be of the depression structure at the position corresponding to the chip binding region, reduce the EM value of the alignment film at the position corresponding to the chip binding region, which results in that the EM value of the alignment film at the position corresponding to the chip binding region is less than or equal to the distance between the chip binding region and the displaying region, or, in other words, the orthographic projection of the alignment film on the substrate does not have a coinciding area with the chip binding region. Therefore, the alignment film will not be spread-coated to the chip binding region. Subsequently, when the chip to be bound is bound with the metal wiring in the array base plate, the chip to be bound is not required to contact the aliment film, which prevents the corrosion of the leads of the chip to be bound caused by the water vapor absorbed by the alignment film, and in turn prevents the problem of the screen blacking of the liquid-crystal displaying device.

An embodiment of the present disclosure provides a display panel, wherein the display panel comprises the array base plate 20 according to the above embodiments, The particular description on the array base plate 20 may refer to the description on the above embodiments, and are not discussed further in the embodiments of the present disclosure.

Figure 6:
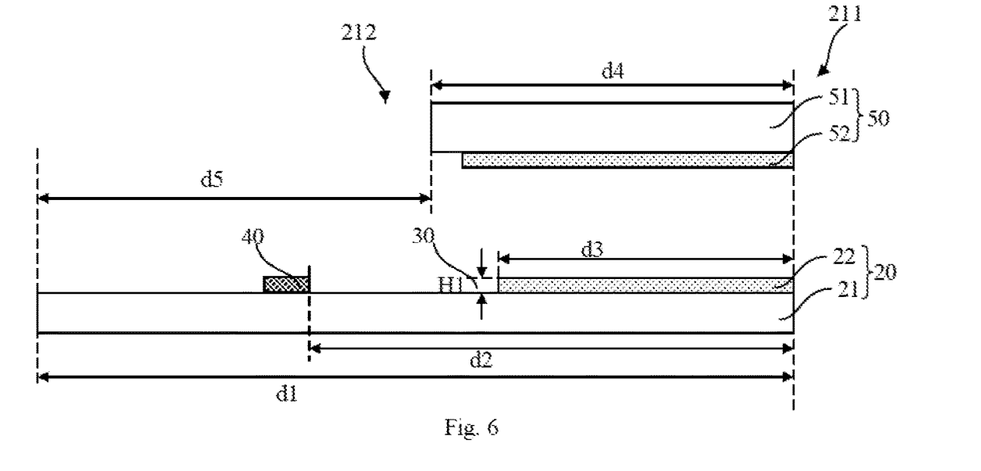
FIG. 6 shows a schematic structural diagram of a displaying device corresponding to the array base plate shown in FIG. 3.
Figure 7:
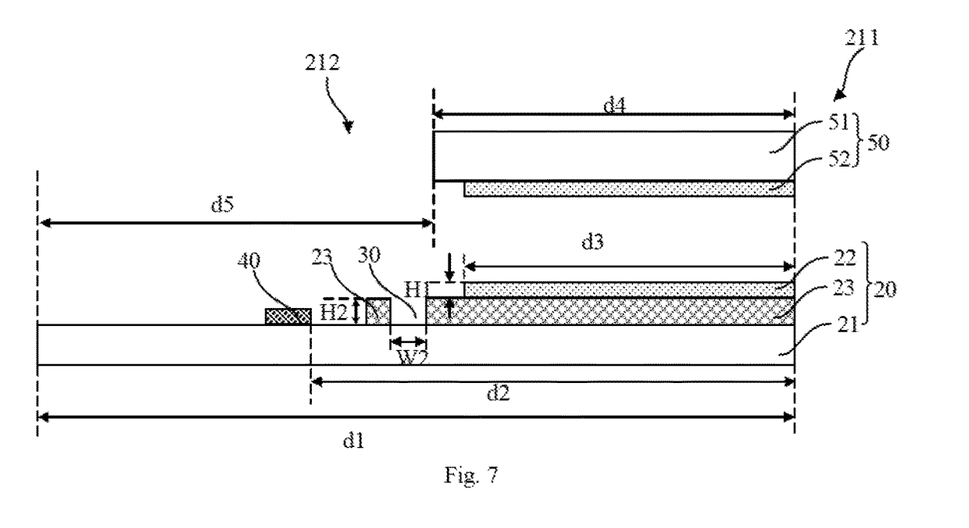
FIG. 7 shows a schematic structural diagram of a displaying device corresponding to the array base plate shown in FIG. 5.

An embodiment of the present disclosure further provides a displaying device, as shown in FIGS. 6 and 7, comprising a chip to be bound 40 and the display panel stated above. The chip to be bound 40 is provided on the substrate 21 in the array base plate 20, and is bound to the metal wiring in the array base plate 20.

The display panel further comprises a color-film base plate 50. The color-film base plate 50 comprises a substrate base plate 51 and an alignment-film layer 52 that is provided on the substrate base plate 51. The substrate base plate 51 comprises a second base plate, and a black matrix and a color-class layer that are formed on the second base plate. Moreover, the substrate base plate 51 further comprises a common electrode formed on the second base plate.

Moreover, the display panel further comprises a liquid-crystal layer provided between the array base plate 20 and the color-film base plate 50.

As shown in FIGS. 6 and 7, d4 represents the value of the distance between the edge of the substrate base plate 51 in the color-film base plate 50 and the displaying region 211, and d5 represents the value of the distance between the edge of the substrate base plate 51 in the color-film base plate 50 and the edge of the substrate 21 in the array base plate 20.

For example, when the width d1 of the boundary frame of the liquid-crystal displaying device is 3.15 min, the value d4 of the distance between the edge of the substrate base plate 51 in the color-film base plate 50 and the displaying region 211 is 1.1 mm, and the value d5 of the distance between the edge of the substrate base plate 51 in the color-film base plate 50 and the edge of the substrate 21 in the array base plate 20 is 2.05 mm.

In the practical product, the chip to be bound 40 is actually a source-driven integrated circuit (IC) chip, the metal wiring in the array base plate 52 is actually a data line, and the chip to be bound 40 is particularly located at the side of the data-line data pad (DP) of the array base plate 20.

In an embodiment of the present disclosure, the displaying device is a liquid crystal displaying device, and the displaying device may be any narrow-boundary-frame products or components having the displaying function, such as a mobile phone, a tablet personal computer, a television, a display, a notebook computer and a navigator.

The embodiments of the present disclosure, by configuring the target film layer to be of the depression structure at the position corresponding to the chip binding region, reduce the EM value of the alignment film at the position corresponding to the chip binding region, which results in that the EM value of the alignment film at the position corresponding to the chip binding region is less than or equal to the distance between the chip binding region and the displaying region, or, in other words, the orthographic projection of the alignment film on the substrate does not have a coinciding area with the chip binding region. Therefore, the alignment film will not be spread-coated to the chip binding region. Subsequently, when the chip to be bound is bound with the metal wiring in the array base plate, the chip to be bound is not required to contact the alignment film, which prevents the corrosion of the leads of the chip to be bound caused by the water vapor absorbed by the alignment film, and in turn prevents the problem of the screen blacking of the liquid-crystal displaying device.

Figure 8:
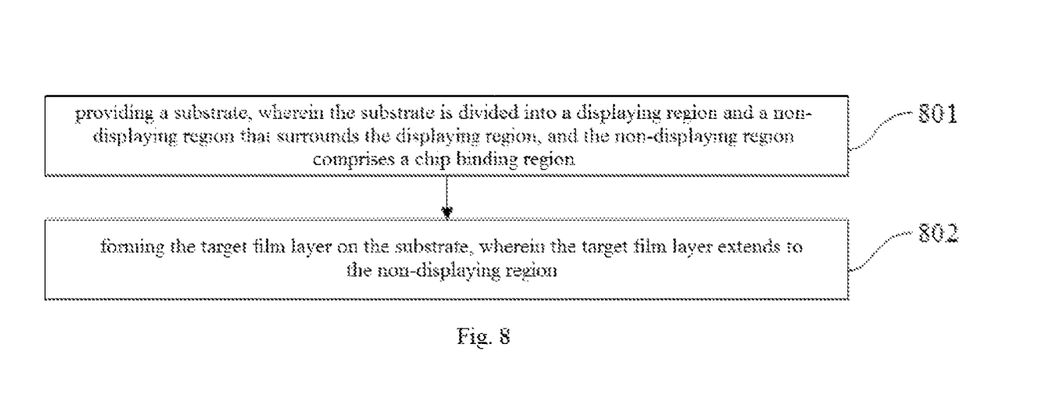
FIG. 8 shows a flow chart of the method for fabricating the array base plate according to an embodiment of the present disclosure.

Referring to FIG. 8, FIG. 8 shows a flow chart of the method for fabricating the array base plate according to an embodiment of the present disclosure. The method may particularly comprise the following steps:

Step 801: providing a substrate, wherein the substrate is divided into a displaying region and a non-displaying region that surrounds the displaying region, and the non-displaying region comprises a chip binding region.

In an embodiment of the present disclosure, this step comprises, firstly, fabricating the substrate 21, wherein the substrate 21 is divided into the displaying region 211 and the non-displaying region 212 that surrounds the displaying region 211, and the non-displaying region 212 comprises the chip binding region 213.

Particularly, the substrate 21 comprises a first base plate, a thin-film transistor formed on the first base plate, and a pixel electrode connected to the drain of the thin-film transistor. In the actual fabrication process, firstly the thin-film transistor is formed on the first base plate, and then the pixel electrode connected to the drain of the thin-film transistor is formed, to obtain the substrate 21.

Step 802: forming the target film layer on the substrate, wherein the target film layer extends to the non-displaying region.

In an embodiment of the present disclosure, this step comprises, subsequently, forming the target film layer on the substrate 21, wherein the target film layer may be the alignment film 22 or the organic film layer 23, and the target film layer extends to the non-displaying region 212.

The target film layer has a depression structure 30 on the side that faces the chip binding region 213, and the position of the depression structure 30 corresponds to the position of the chip binding region 213, whereby the orthographic projection of the alignment film 22 in the array base plate 20 on the substrate 21 does not have a coinciding area with the chip binding region 213.

In an alternative embodiment of the present disclosure, the Step 802 particularly comprises: forming the alignment film on the substrate by using an Asahikasei Photosensitive Resin plate, wherein the Asahikasei Photosensitive Resin plate has a depression pattern that corresponds to the depression structure, and a depressing direction of the depression structure is a direction along the non-displaying region to the displaying region.

Figure 9:
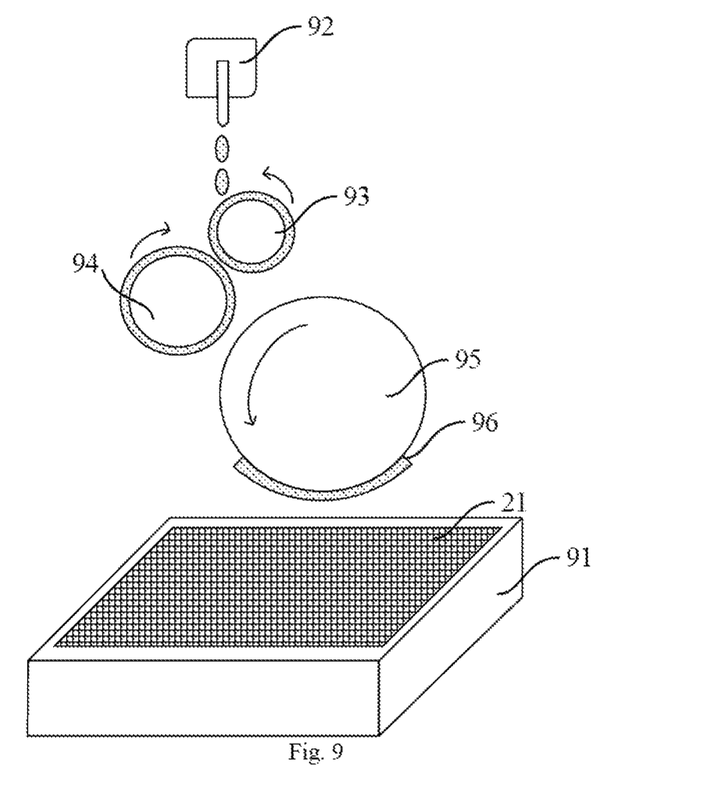
FIG. 9 shows a schematic diagram of the fabrication of the alignment film by using an APR plate.

As shown in FIG. 9, this step comprises, after the substrate 21 has been fabricated, placing the substrate 21 onto a bench 91, providing a storage container 92 storing a PI solution, spread-coating the PI solution to a doctor roll 93 by using a nozzle in the storage container 92, transfer-printing the solution to an anilox roller 94 by the rotation of the doctor roll 93, wherein the APR plate 96 wraps and is fixed to the periphery of a plate trunk 95, and the rotation of the anilox roller 94 can transfer-print the PI solution to the APR plate 96 uniformly, and, subsequently, transfer-printing the PI solution in the APR plate 96 onto the substrate 21 by pressing, to form the alignment film 22.

Therefore, when the target film layer is the alignment film 22, in order to realize that the alignment film 22 has the depression structure 30 at the position corresponding to the chip binding region 213, and the depressing direction of the depression structure 30 is the direction along the non-displaying region 212 to the displaying region 211. It is required to design the depression pattern corresponding to the depression structure 30 at the corresponding position of the APR plate 96. Therefore, by fabricating the alignment film 22 by using the APR plate 96, the alignment film 22 having the depression structure 30 can be fabricated, which, without changing the equipment and the process, realizes the spread coating of the narrow-boundary-frame alignment film 22, and ensures that the alignment film 22 will not be spread-coated to the chip binding region 213.

In another alternative embodiment of the present disclosure, the Step 802 particularly comprises: forming the organic film layer on the substrate by using a patterning process, wherein a depressing direction of a depression structure of the organic film layer is a direction perpendicular to the substrate.

This step comprises, after the substrate 21 has been fabricated, spread-coating an organic thin film onto the substrate 21, exposing the organic thin film by using a mask, and developing after the exposure has been completed, to remove the organic thin film at the exposure area, and obtain the organic film layer 23 having the depression structure 30. The depression structure 30 is the structure that is formed after the organic thin film has been removed, and the depressing direction of the depression structure 30 is the direction perpendicular to the substrate 21.

After the organic film layer 23 has been formed on the substrate 21 by using a patterning process, it is further required to form the alignment film 22 on the organic film layer 23. The alignment film 22 may also be fabricated by using an APR plate, and, at this point, the APR plate is not required to be provided with the depression pattern corresponding to the depression structure 30 shown in FIG. 2.

The embodiments of the present disclosure, by configuring the target film layer to be of the depression structure at the position corresponding to the chip binding region, reduce the EM value of the alignment film at the position corresponding to the chip binding region, which results in that the EM value of the alignment film at the position corresponding to the chip binding region is less than or equal to the distance between the chip binding region and the displaying region, or, in other words, the orthographic projection of the alignment film on the substrate does not have a coinciding area with the chip binding region. Therefore, the alignment film will not be spread-coated to the chip binding region. Subsequently, when the chip to be bound is bound with the metal wiring in the array base plate, the chip to be bound is not required to contact the alignment film, which prevents the corrosion of the leads of the chip to be bound caused by the water vapor absorbed by the alignment film, and in turn prevents the problem of the screen blacking of the liquid-crystal displaying device.

Regarding the above-described process embodiments, for brevity of the description, all of them are expressed as the combination of a series of actions, but a person skilled in the art should know that the present disclosure is not limited by the sequences of the actions that are described, because, according to the present disclosure, some of the steps may have other sequences or be performed simultaneously. Secondly, a person skilled in the art should also know that all of the embodiments described in the description are preferable embodiments, and not all of the actions and the modules that they involve are required by the present disclosure.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The array base plate and the fabricating method thereof, the display panel and the displaying device according to the present disclosure have been described in detail above. The principle and the embodiments of the present disclosure are described herein with reference to the particular examples, and the description of the above embodiments is merely intended to facilitate to understand the method according, to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. An array base plate, wherein the array base plate comprises a substrate, the substrate is divided into a displaying region and a non-displaying region that surrounds the displaying region, and the non-displaying region comprises a chip binding region;
   the array base plate further comprises a target film layer provided on the substrate, and the target film layer extends to the non-displaying region; and
   the target film layer has a depression structure on a side that faces the chip binding region, and a position of the depression structure corresponds to a position of the chip binding region, whereby an orthographic projection of an alignment film in the array base plate on the substrate does not have a coinciding area with the chip binding region.

2. The array base plate according to claim 1, wherein the target film layer is the alignment film, and a depressing direction of the depression structure is a direction along the non-displaying region to the displaying region.

3. The array base plate according to claim 2, wherein an orthographic projection of the depression structure on the substrate is a curve.

4. The array base plate according to claim 3, wherein a first protrusion structure and a second protrusion structure are provided on a side of the alignment film that faces the chip binding region; and
   the first protrusion structure and the second protrusion structure are connected to two sides of the depression structure, and protruding directions of the first protrusion structure and the second protrusion structure are a direction along the displaying region to the non-displaying region.

5. The array base plate according to claim 4, wherein both of orthographic projections of the first protrusion structure and the second protrusion structure on the substrate are a curve; and
   positions where the first protrusion structure and the second protrusion structure connect to the depression structure form a smooth curved surface.

6. The array base plate according to claim 2, wherein a depth of the depression structure in a first direction is 0.2 mm to 0.5 mm; and
   a difference between a length of the depression structure in a second direction and a length of a chip to be bound in the second direction is 3 mm to 5 mm, and the length of the depression structure is greater than the length of the chip to be bound;
   wherein the first direction is the direction along the non-displaying region to the displaying region, the second direction is perpendicular to the first direction, and the second direction is parallel to a plane where the substrate is located.

7. The array base plate according to claim 6, wherein a height of the depression structure in a direction perpendicular to the substrate is equal to a thickness of the alignment film.

8. The array base plate according to claim 2, wherein a thickness of the alignment film is 0.08 µm to 0.15 µm.

9. The array base plate according to claim 1, wherein the target film layer is an organic film layer, and the alignment film is arranged on the organic film layer; and
   a depressing direction of the depression structure is a direction perpendicular to the substrate.

10. The array base plate according to claim 9, wherein an orthographic projection of the depression structure on the substrate is a closed pattern.

11. The array base plate according to claim 9, wherein a width of the depression structure in a first direction is 20 µm to 30 µm; and
    a difference between a length of the depression structure in a second direction and a length of a chip to be bound in the second direction is 3 mm to 5 mm, and the length of the depression structure is greater than the length of the chip to be bound;
    wherein the first direction is the direction along the non-displaying region to the displaying region, the second direction is perpendicular to the first direction, and the second direction is parallel to a plane where the substrate is located.

12. The array base plate according to claim 11, wherein a height of the depression structure in a direction perpendicular to the substrate is less than or equal to a thickness of the organic film layer.

13. The array base plate according to claim 9, wherein a thickness of the organic film layer is 1 µm to 3 µm.

14. The array base plate according to claim 1, wherein the substrate comprises a first base plate, a thin-film transistor formed on the first base plate, and a pixel electrode connected to a drain of the thin-film transistor.

15. A display panel, wherein the display panel comprises the array base plate according to claim 1.

16. The display panel according to claim 15, wherein the display panel further comprises a color-film base plate, and the color-film base plate comprises a substrate base plate and an alignment-film layer that is arranged on the substrate base plate; and
    the substrate base plate comprises a second base plate, and
    a black matrix and a color-class layer that are formed on the second base plate.

17. A displaying device, wherein the displaying device comprises a chip to be bound and the display panel according to claim 15; and
    the chip to be bound is arranged at the chip binding region, and is bound to a metal wiring in the array base plate.

18. A method for fabricating the array base plate according to claim 1, wherein the method comprises:
provides a substrate, wherein the substrate is divided into a displaying region and a non-displaying region that surrounds the displaying region, and the non-displaying region comprises a chip binding region; and
forming the target film layer on the substrate, wherein the target film layer extends to the non-displaying region;
wherein the target film layer has a depression structure on a side that faces the chip binding region, and a position of the depression structure corresponds to a position of the chip binding region, whereby an orthographic projection of an alignment film in the array base plate on the substrate does not have a coinciding area with the chip binding region.

19. The method according to claim 18, wherein the step of forming the target film layer on the substrate comprises:
forming the alignment film on the substrate by using a photosensitive resin plate, wherein the photosensitive resin plate has a depression pattern that corresponds to the depression structure, and a depressing direction of the depression structure is a direction along the non-displaying region to the displaying region.

20. The method according to claim 18, wherein the step of forming the target film layer on the substrate comprises:
forming the organic film layer on the substrate by using a patterning process, wherein a depressing direction of a depression structure of the organic film layer is a direction perpendicular to the substrate; and
after the step of forming the organic film layer on the substrate by using the patterning process, the method further comprises:
forming the alignment film on the organic film layer.

* * * * *